US008998312B2

(12) United States Patent  
Sellers et al.

(10) Patent No.: US 8,998,312 B2  
(45) Date of Patent: Apr. 7, 2015

(54) INFANT SAFETY SEAT (75) Inventors: Gregory S. Sellers, Christiana, PA (US); Bruce L. Williams, Narvon, PA (US); Wanquan Zhu, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 316 days.

(21) Appl. No.: 13/280,460

(22) Filed: Oct. 25, 2011

(65) Prior Publication Data

US 2012/0104808 A1 May 3, 2012

Related U.S. Application Data (60) Provisional application No. 61/456,002, filed on Oct. 29, 2010.

(30) Foreign Application Priority Data

Sep. 9, 2011 (CN) .......................... 2011 1 0279212

(51) Int. Cl.  
*A47D 13/02* (2006.01)  
*B60N 2/28* (2006.01)

(52) U.S. Cl.  
CPC ............ *B60N 2/2845* (2013.01); *B60N 2/2863* (2013.01)

(58) Field of Classification Search  
USPC ................... 297/183.2, 183.3, 183.4, 184.13, 297/411.38  
See application file for complete search history.

(56) References Cited

U.S. PATENT DOCUMENTS

| 4,634,177 | A | * | 1/1987 | Meeker ..................... 297/256.13 |
| 5,244,292 | A | * | 9/1993 | Wise .......................... 297/183.3 |
| 5,522,639 | A | * | 6/1996 | Jaime ........................ 297/184.13 |
| 5,863,097 | A | * | 1/1999 | Harper et al. ............... 297/260.2 |
| 6,145,927 | A |   | 11/2000 | Lo |
| 6,561,577 | B2 | * | 5/2003 | Kelly .......................... 297/183.2 |
| 6,715,828 | B1 | * | 4/2004 | Cheng ......................... 297/183.3 |
| 6,913,313 | B2 | * | 7/2005 | Sedlack ...................... 297/183.4 |
| 7,384,102 | B2 | * | 6/2008 | Chen et al. ................. 297/411.32 |
| 2005/0264062 | A1 |   | 12/2005 | Longenecker et al. |

FOREIGN PATENT DOCUMENTS

| CN | 201124779 Y | 10/2008 |
| EP | 1839937 A1 | 3/2007 |
| GB | 2393996 A | 4/2004 |
| GB | 2432345 A | 5/2007 |
| GB | 2483560 A | 3/2012 |
| WO | 2010119446 A2 | 3/2007 |

* cited by examiner

*Primary Examiner* — Peter Brown  
(74) *Attorney, Agent, or Firm* — David I. Roche; Baker & McKenzie LLP (57) ABSTRACT An infant safety seat comprises a seat shell, a handle and at least a latch element mounted between the seat shell and the handle. Two sides of the seat shell are provided with first coupling elements, each of which includes multiple locking grooves. Two sides of the handle has second coupling elements that are pivotally connected with the first coupling elements, each of the second coupling elements having an interior defining a guide slot. The latch element is movably assembled in the guide slot and includes at least a first stud, the latch element being operable to switch between a locked state where the first stud is engaged with one of the locking grooves to hold the handle in place, and an unlocked state where the first stud is disengaged from the locking grooves to allow rotation of the handle relative to the seat shell.

22 Claims, 12 Drawing Sheets

INFANT SAFETY SEAT

CROSS-REFERENCE TO RELATED APPLICATIONS

This application claims priority to U.S. Provisional Patent Application No. 61/456,002 filed on Oct. 29, 2010, and to China Patent Application No. 201110279212.4 filed on Sep. 9, 2011.

BACKGROUND OF THE INVENTION

1. Field of the Invention

The present invention relates to infant safety seats having an adjustable handle.

2. Description of the Related Art

Current infant safety seats may include a handle element that is assembled with the seat to facilitate grasp of the infant safety seat. The handle may be pivoted relative to the seat to adjust its inclination. However, the adjustment mechanism that is provided between the handle and the seat is usually complex in construction, which may increase the weight of the handle block and result in higher manufacture cost.

Therefore, there is a need for an infant safety seat provided with a handle assembly that is simpler in construction and address at least the foregoing issues.

SUMMARY

The present application describes an infant safety seat that has an adjustable handle. In one embodiment, the infant safety seat comprises a seat shell, a handle and at least a latch element mounted between the seat shell and the handle. Two sides of the seat shell are provided with first coupling elements, each of which includes multiple locking grooves. Two sides of the handle has second coupling elements that are pivotally connected with the first coupling elements, each of the second coupling elements having an interior defining a guide slot. The latch element is movably assembled in the guide slot and includes at least a first stud, the latch element being operable to switch between a locked state where the first stud is engaged with one of the locking grooves to hold the handle in place, and an unlocked state where the first stud is disengaged from the locking grooves to allow rotation of the handle relative to the seat shell.

DETAILED DESCRIPTION OF THE EMBODIMENTS

Figure 1:
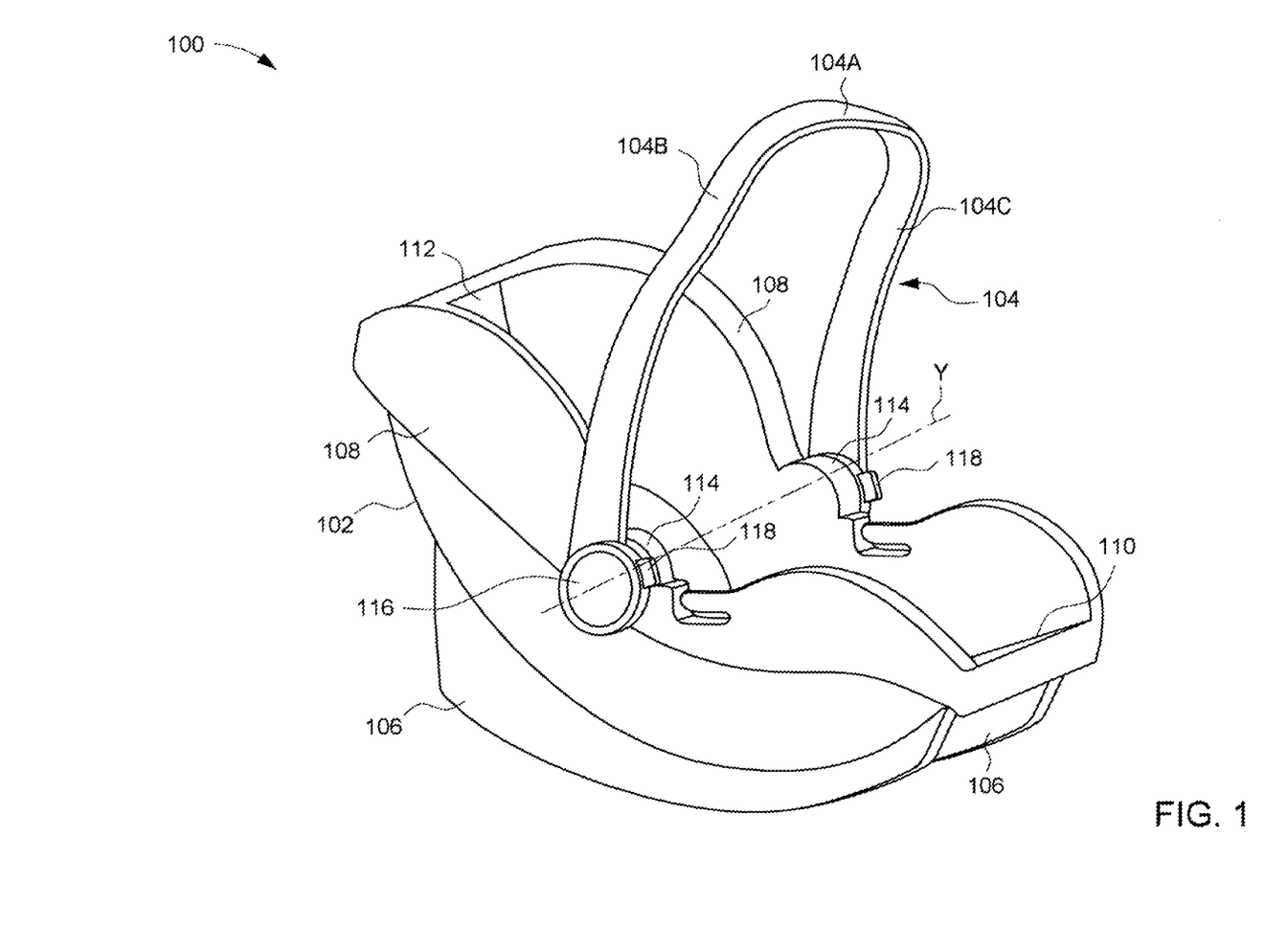
FIG. 1 is a perspective view illustrating one embodiment of an infant safety seat.

FIG. 1 is a perspective view illustrating one embodiment of an infant safety seat 100. The infant safety seat 100 can include a seat shell 102, and a handle 104 connected with left and right sides of the seat shell 102. The seat shell 102 can be a plastic shell formed integral by plastic molding. A lower side of the seat shell 102 can be provided with protruding support rails 106. Left and right sides of the seat shell 102 can respectively include lateral sidewalls 108, and a seat portion 110 and a backrest 112 can be defined between the two lateral sidewalls 108. The two sidewalls 108 can respectively include first coupling elements 114 configured to assemble with the handle 104.

The handle 104 can include a transverse segment 104A, and two side segments 104B and 104C respectively connected with the left and right side ends of the transverse segment 104A. Lower end portions of the side segments 104B and 104C can be respectively provided with second coupling elements 116. The second coupling elements 116 can be respectively connected pivotally with the first coupling elements 114 to define a pivot axis Y about which the handle 104 can rotate relative to the seat shell 102. Moreover, a latch element 118 can be assembled between the first and second coupling elements 114 and 116 at one or both of the left and right sides. The latch element 118 can be operable to lock the handle 104 at a desired angular position.

Figure 2:
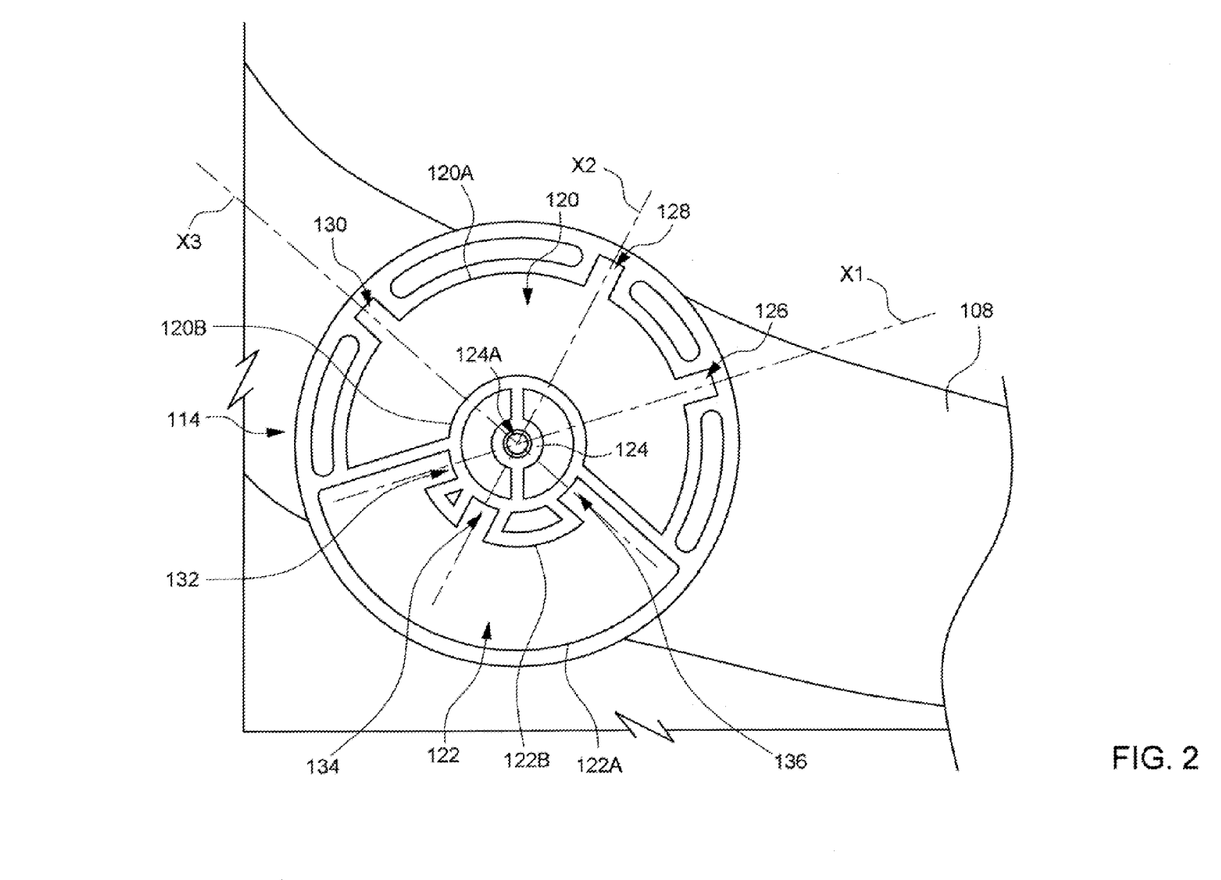
FIG. 2 is a schematic view illustrating an inner side of a first coupling element provided in the infant safety seat shown in FIG. 1.

FIG. 2 is a schematic view illustrating an inner side of the first coupling element 114. The first coupling element 114 can have a generally circular shape having a recessed interior in which are defined a first cavity 120 and a second cavity 122. The first coupling element 114 can also include a shaft portion 124 that projects from a center thereof toward the second coupling element 116. The shaft portion 124 can include a central opening 124A. The first cavity 120 can be delimited at least partially between a peripheral outer sidewall 120A and an inner sidewall 120B. The outer and inner sidewalls 120A and 120B can have generally arc shapes respectively centered about the shaft portion 124, the inner sidewall 120B being closer to the shaft portion 124 than the outer sidewall 120A. The second cavity 122 can be delimited at least partially between a peripheral outer sidewall 122A and an inner sidewall 122B. The outer and inner sidewalls 122A and 122B can have generally arc shapes respectively centered about the shaft portion 124, the inner sidewall 122B being closer to the shaft portion 124 than the outer sidewall 122A. The outer sidewall 120A of the first cavity 120 can include a plurality of locking positions distributed in different radial directions relative to the shaft portion 124, e.g., first, second and third locking grooves 126, 128 and 130. The inner sidewall 122B of the second cavity 122 can also include a plurality of locking positions distributed in different radial directions relative to the shaft portion 124, e.g., fourth, fifth and sixth locking grooves 132, 134 and 136. The locking positions provided in the first cavity 120 can be respectively associated with the locking positions provided in the second cavity 122. For example, the first locking groove 126 and the fourth locking groove 132 can be aligned with a first diameter axis X1, the second locking groove 128 and the fifth locking groove 134 can be aligned with a second diameter axis X2, and the third locking groove 130 and the sixth locking groove 136 can be aligned with a third diameter axis X3.

Figure 3:
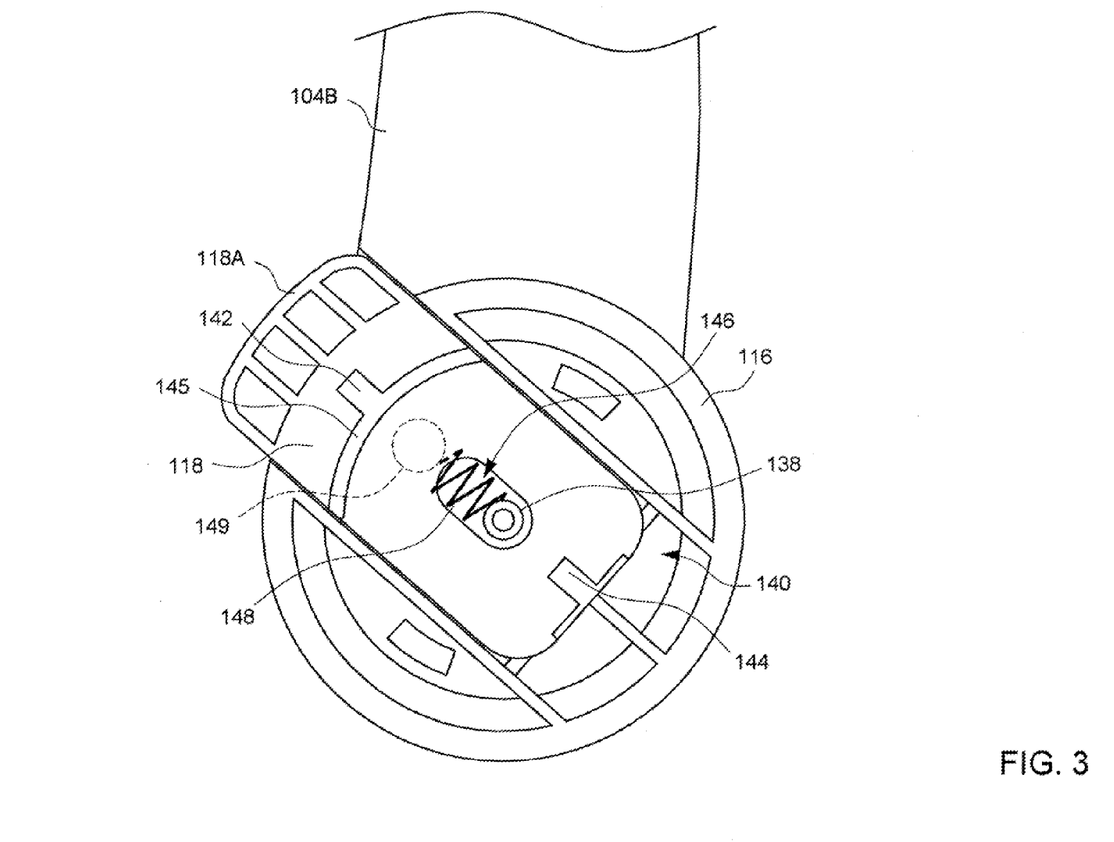
FIG. 3 is a schematic view illustrating the assembly of a latch element with a second coupling element provided on the handle of the infant safety seat.

FIG. 3 is a schematic view illustrating the assembly of the latch element 118 with the second coupling element 116. The second coupling element 116 can be formed as a generally cylindrical shell including an axle 138 projecting from a center position toward the first coupling element 114. The recessed interior of the second coupling element 116 can include a guide slot 140 along which the latch element 118 is movably mounted. In one embodiment, the latch element 118 can have a generally rectangular shape. A distal end of the latch element 118 can form an actuator portion 118A that can extend outward from the second coupling element 116 for operation by a user. A surface of the latch element 118 facing the first coupling element 114 can include protruding first and second studs 142 and 144 spaced apart from each other, and a guide slot 146 formed between the first and second studs 142 and 144. In one embodiment, the latch element 118 can further include an abutment 145 protruding adjacent to the first stud 142. A spring 148 can be mounted between the latch element 118 and an inner wall of the second coupling element 116. For example, the spring 148 can have two ends respectively connected with the axle 138 and a rib 149 (shown with dashed lines) projecting from the interior of the second coupling element 116.

Figure 4:
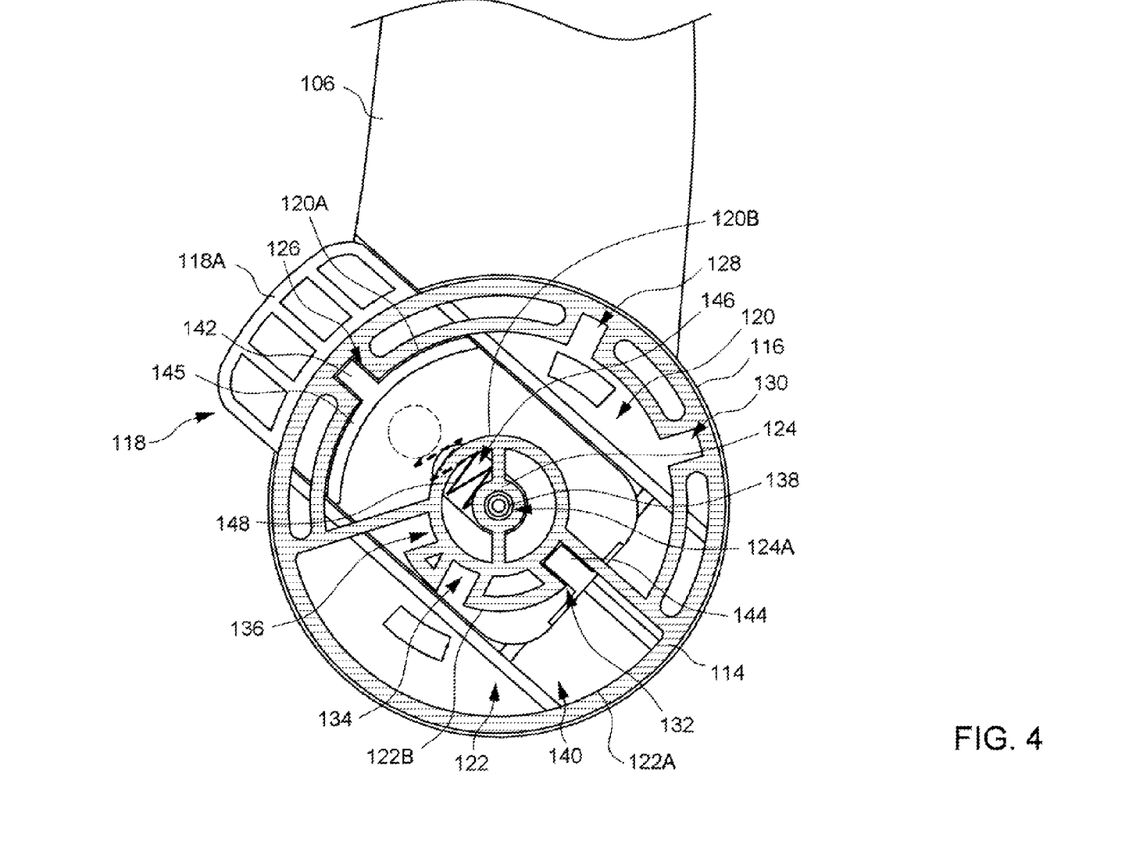
FIGS. 4 and 5 are partially cross-sectional views respectively illustrating the assembly and operation of the latch element relative to the first and second coupling elements.
Figure 5:
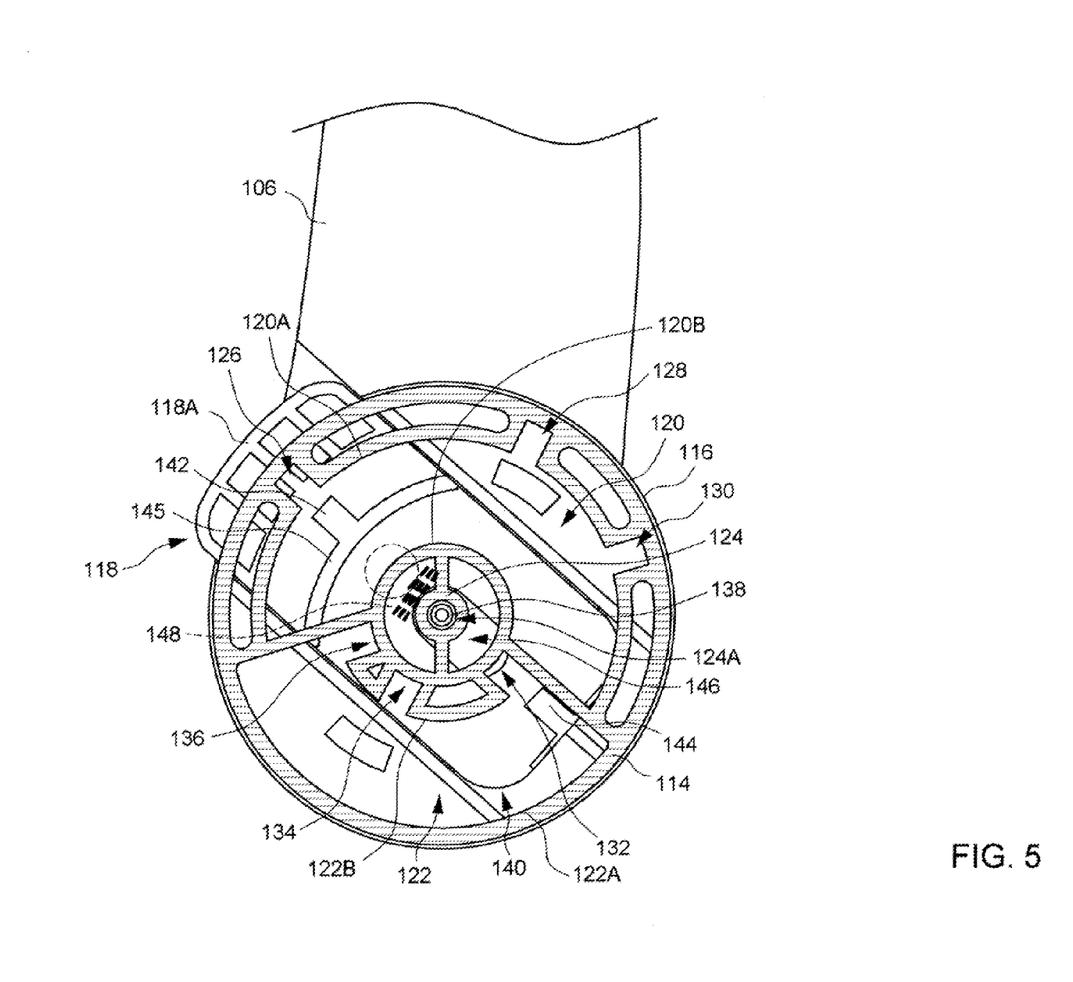

FIGS. 4 and 5 are partially cross-sectional views illustrating the assembly and operation of the latch element 118 relative to the first and second coupling elements 114 and 116. The axle 138 can have a diameter that is smaller than the opening 124A of the shaft portion 124, such that the axle 138 can be pivotally assembled through the opening 124A of the shaft portion 124. Moreover, the shaft portion 124 can be mounted through the guide slot 146 of the latch element 118. Accordingly, the second coupling element 116 and the latch element 118 can rotate relative to the first coupling element 114 when the handle 104 is pivotally adjusted relative to the seat shell 102. As shown in FIG. 4, the biasing action of the spring 148 can act to keep the latch element 118 in a locked state. In the locked state, the actuator portion 118A of the latch element 118 can extend outward and be visible from an outside of the first and second coupling elements 114 and 116, the abutment 145 can rest in contact against the outer sidewall 120A, and the first and second studs 142 and 144 can be in engagement with a pair of corresponding locking positions, such as the first and fourth locking grooves 126 and 132 as shown in FIG. 4. The handle 104 can be thereby locked in a first angular position (for example the position shown in FIG. 1).

As shown in FIG. 5, the actuator portion 118A can be depressed to displace the latch element 118 from the locked position toward the unlocked position. As a result, the latch element 118 can slide along the guide slot 140 and compress the spring 148, whereas the first and second studs 142 and 144 can respectively disengage from the first and fourth locking grooves 126 and 132. With the latch element 118 in the unlocked state, the handle 104 can be rotated relative to the seat shell 102 until it reaches a desired position. The actuator portion 118A then can be released, and the spring 148 can urge the latch element 118 to recover the locked state to hold the handle 104 in place.

As shown in FIGS. 3-5, multiple locking positions can be provided in a plurality of radial directions relative to the axis of rotation of the handle 104 so that the handle 104 can be adjusted and held in different angular positions.

Figure 6:
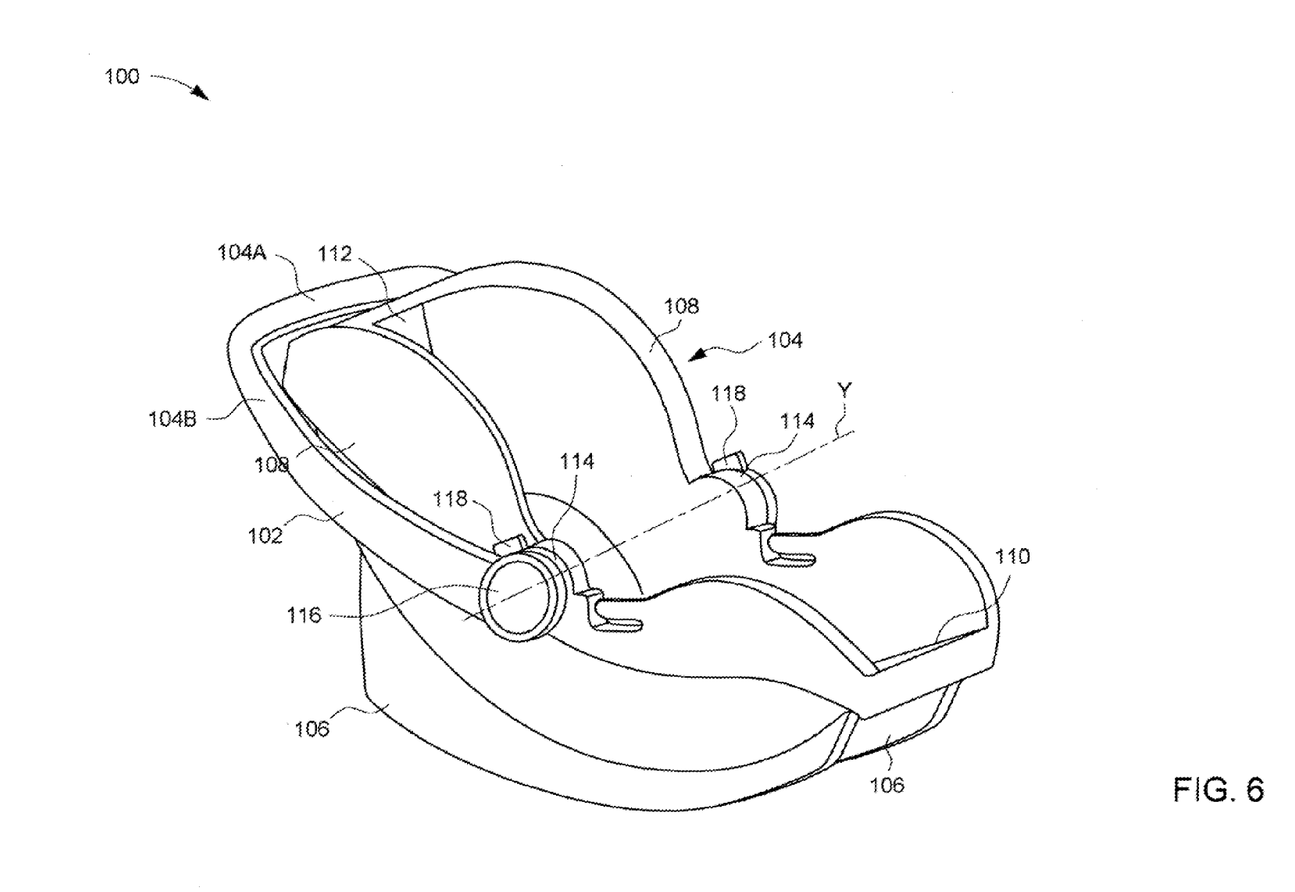
FIGS. 6 and 7 are perspective views illustrating the handle of the infant safety seat in second and third angular positions.

FIG. 6 is a perspective view illustrating the handle 104 held in a second angular position. In this second angular position, the first and second studs 142 and 144 can respectively engage with the second and fifth locking grooves 128 and 134. Moreover, the handle 104 can generally extend upward toward the rear of the seat shell 102 so as to reduce the space occupied by the entire seat 100.

Figure 7:
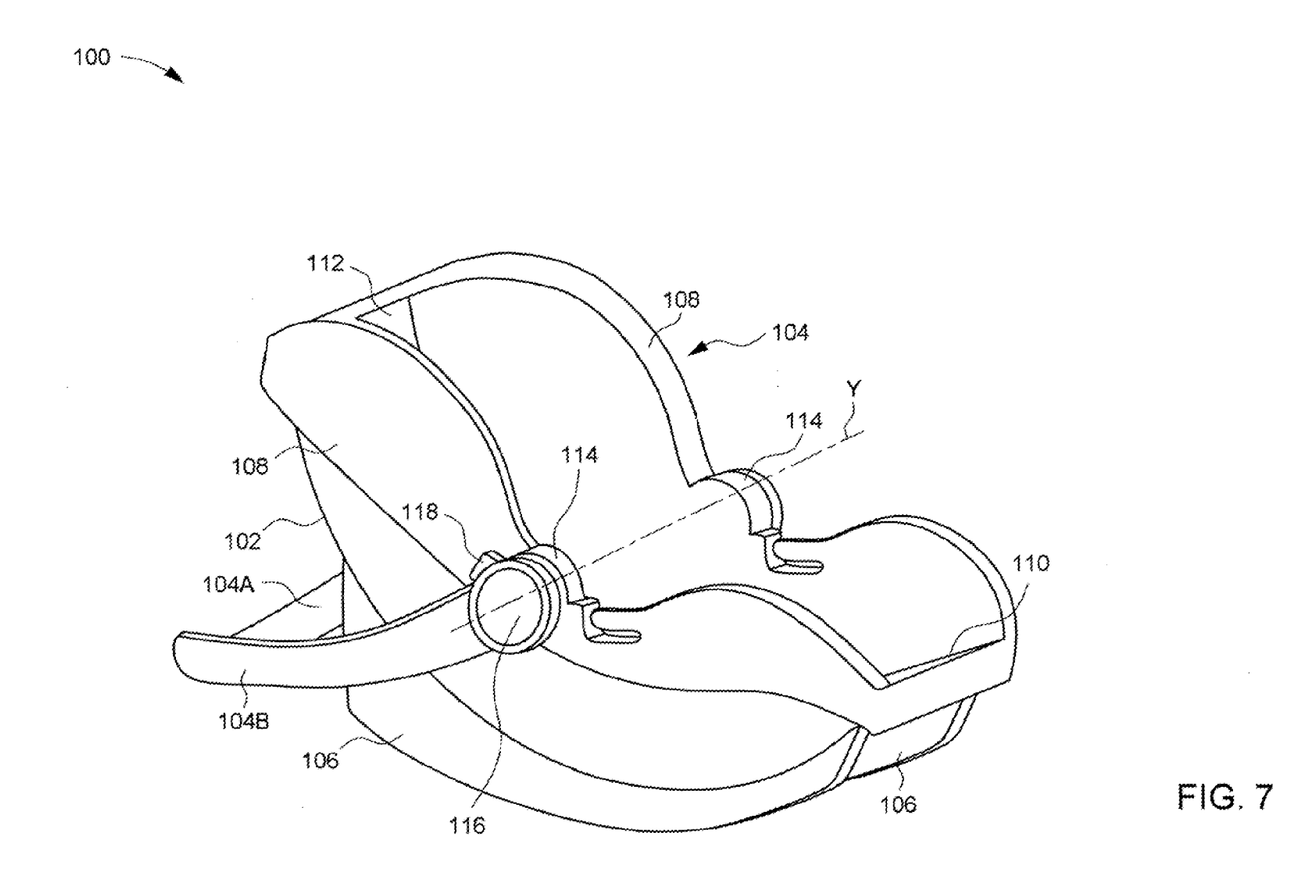

FIG. 7 is a perspective view illustrating the handle 104 held in a third angular position. In this third angular position, the first and second studs 142 and 144 can respectively engage with the third and sixth locking grooves 130 and 136. Moreover, the handle 104 can generally extend downward toward the rear of the seat shell 102. In this configuration, the handle 104 and the support rails 106 can be in contact with a resting surface to provide stable support for the entire seat 100.

Figure 8:
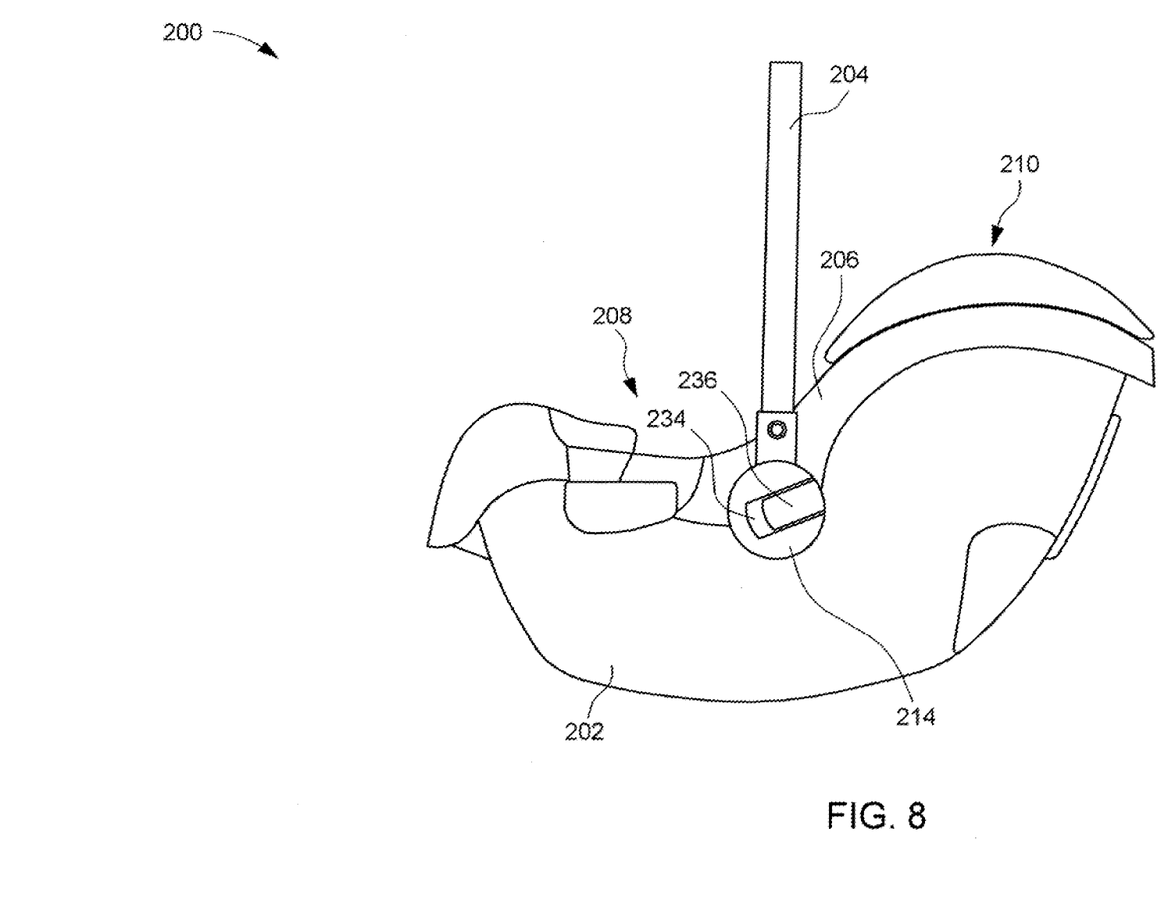
FIG. 8 is a side view illustrating a second embodiment of an infant safety seat.

FIG. 8 is a side view illustrating a second embodiment of an infant safety seat 200. Like the previous embodiment, the infant safety seat 200 can include a seat shell 202 and a handle 204. The seat shell 202 can be formed integrally by plastic molding including two lateral sidewalls 206 (only one of which is shown in FIG. 8), a seating portion 208 and a backrest 210. Two side segments of the handle 204 can have lower ends respectively connected pivotally with the two sidewalls 206.

Figure 9:
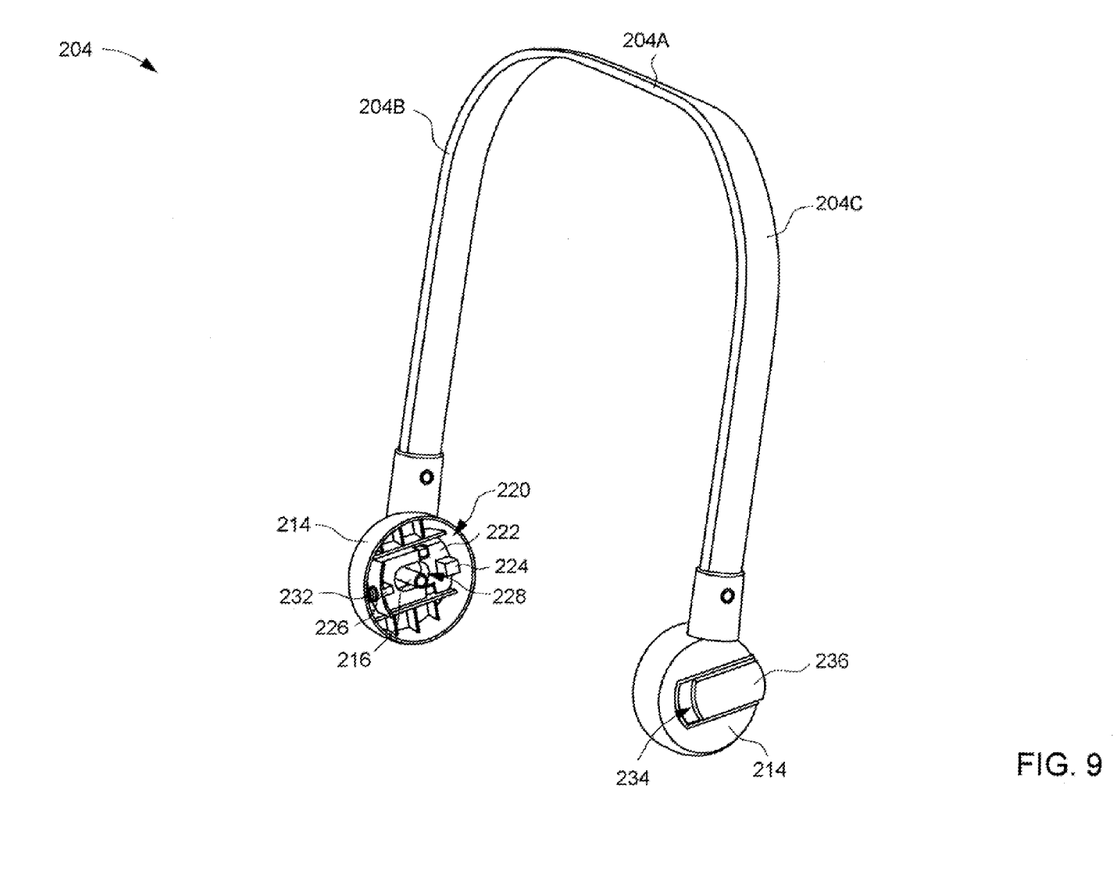
FIG. 9 is a perspective view illustrating a handle provided in the infant safety seat shown in FIG. 8.
Figure 10:
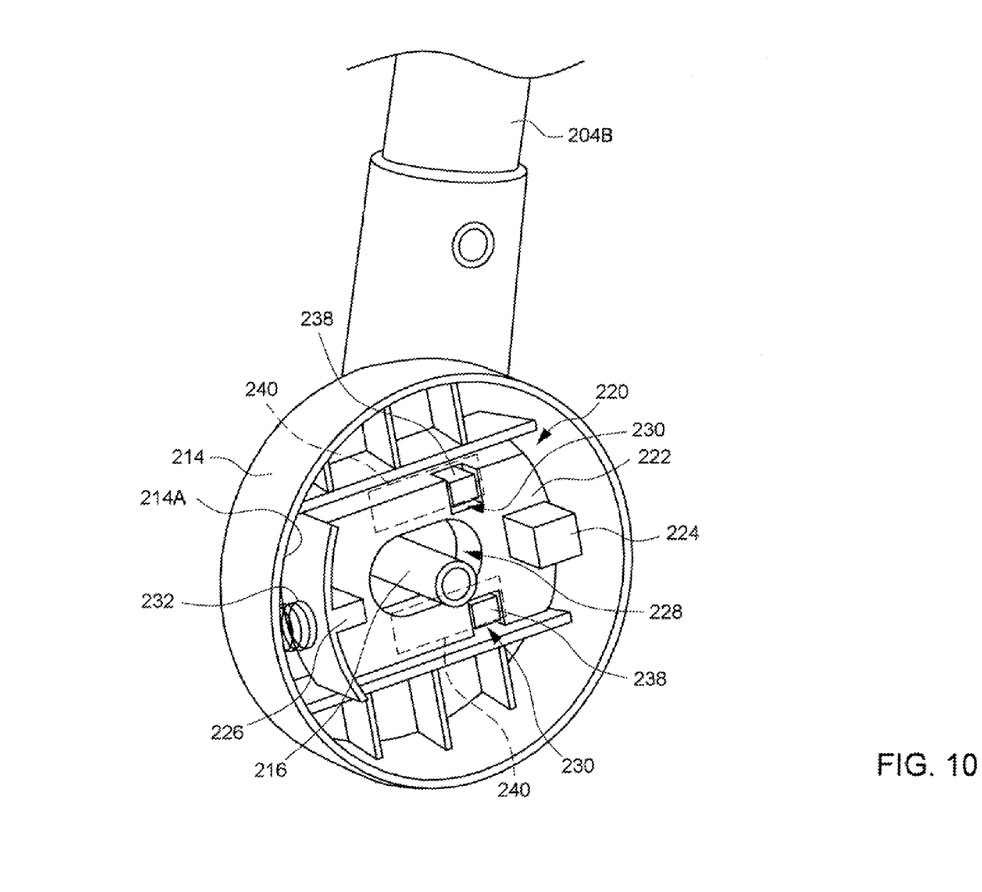
FIG. 10 is a partially enlarged view illustrating the assembly of a latch element in a second coupling element shown in FIG. 9.

FIG. 9 is a perspective view illustrating the construction of the handle 204, and FIG. 10 is a partially enlarged view illustrating a portion of FIG. 9. The handle 204 can include a transverse segment 204A, and two side segments 204B and 204C respectively joined with left and right side ends of the transverse segment 204A. The lower end portions of the side segments 204B and 204C can respectively include second coupling elements 214 that can assemble with first coupling elements 212 (better shown in FIGS. 11 and 12) provided on the sidewalls 206 of the seat shell 202.

Each of the second coupling elements 214 can be formed as a generally circular shell having a recessed interior provided with an axle 216 projecting from a center thereof. The recessed interior of the second coupling element 214 can also define a first guide slot 220 in which a latch element 222 is movably mounted. A surface of the latch element 222 can include protruding first and second studs 224 and 226 spaced apart from each other. An elongated guide slot 228 and two catch holes 230 can be formed between the first and second studs 224 and 226. The two catch holes 230 can be provided at two lateral sides of the guide slot 228.

In addition, the recessed interior of the second coupling element 214 can be mounted with a spring 232. Two opposite ends of the spring 232 can be respectively connected with an inner sidewall 214A of the second coupling element 214 and an end of the latch element 222.

Referring to FIG. 9, an outer surface of the second coupling element 214 can include a second guide slot 234 in which an actuator element 236 is movably mounted. In one embodiment, the actuator element 236 can have an outer surface that is substantially flat to conform with the outer surface of the second coupling element 214, thereby providing a smooth and improved appearance. An inner surface of the actuator element 236 facing the second coupling element 214 can include protruding fastener fingers 238. At corresponding locations, the second coupling element 214 can include two slots 240 (shown with dashed lines in FIG. 10) through which the fastener fingers 238 can pass to fixedly engage and attach with the catch holes 230. The actuator element 236 can be thereby fixedly secured with the latch element 222. Accordingly, the actuator element 236 can be operated to slide on the outer surface of the second coupling element 214 to drive displacement of the latch element 222 along the first guide slot 220 for switching the latch element 222 between locked and unlocked states.

Figure 11:
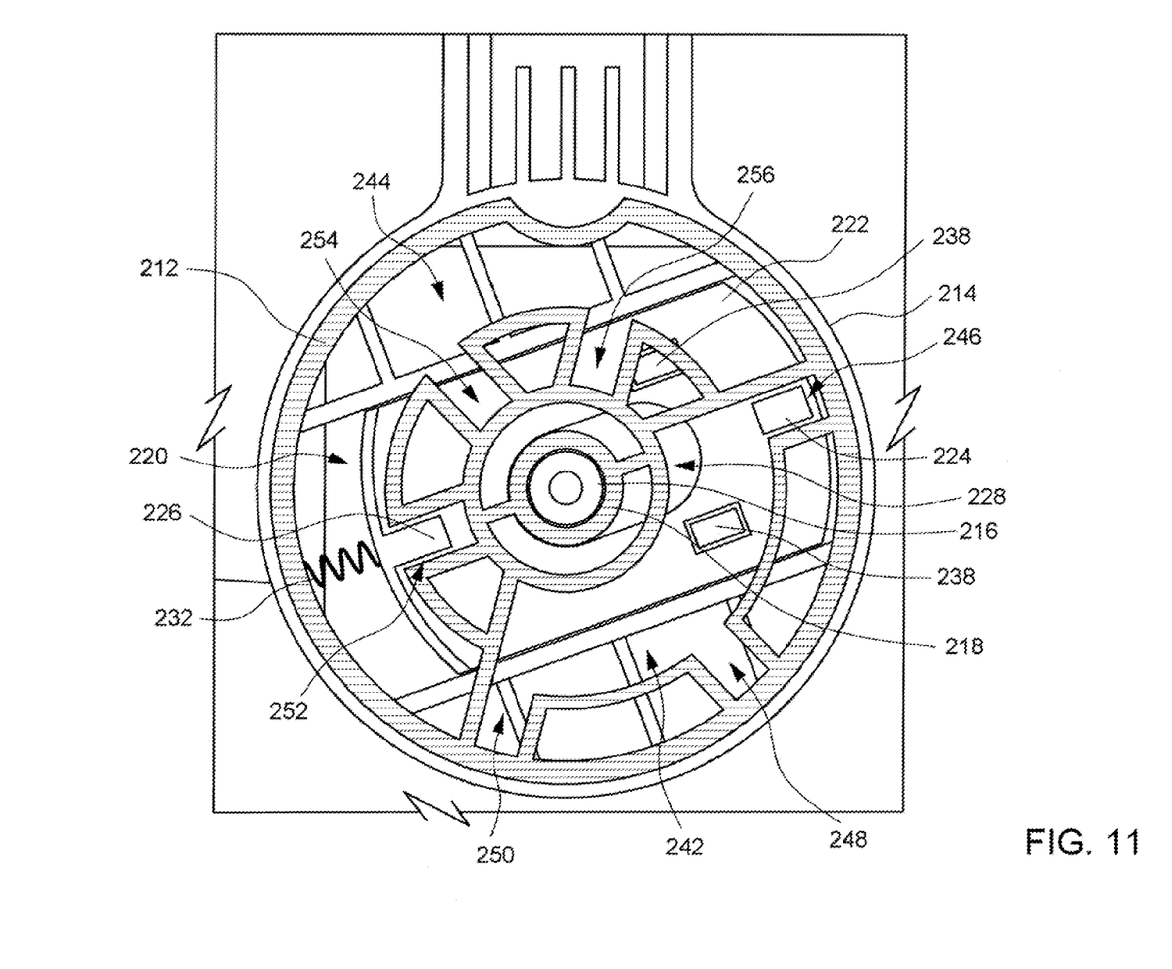
FIGS. 11 and 12 are partially cross-sectional views respectively illustrating a latch element shown in FIG. 10 in locked and unlocked states.
Figure 12:
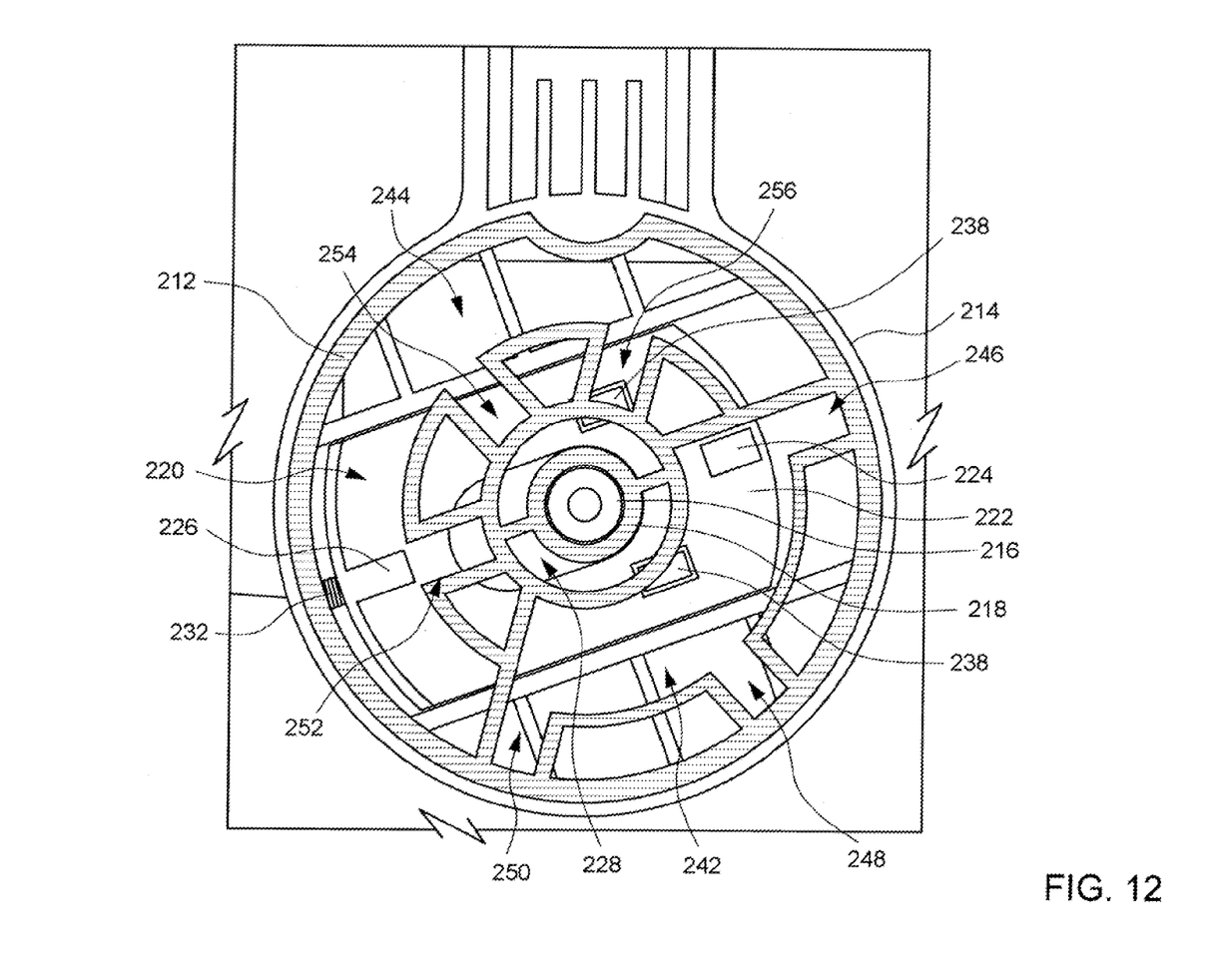

FIGS. 11 and 12 are partially cross-sectional views respectively illustrating the latch element 222 in the locked and unlocked states. Each of the first coupling elements 212 formed on the sidewall 206 can have a generally circular shape corresponding to the shape of the second coupling element 214. A center of the first coupling element 212 can include a hollow shaft portion 218 through which the axle 216 of the second coupling element 214 can be assembled to pivotally connect the first and second coupling elements 212 and 214. Moreover, the shaft portion 218 can pass through the guide slot 228, such that the second coupling element 214 and the latch element 222 can rotate in unison relative to the first coupling element 212.

Like the previous embodiment, the interior of the first coupling element 212 can define first and second cavities 242 and 244. A peripheral outer sidewall of the first cavity 242 can include a plurality of locking positions disposed in different radial directions relative to the shaft portion 218, such as first, second and third locking grooves 246, 248 and 250. An inner sidewall of the second cavity 244 can also include a plurality of locking positions disposed in different radial directions, such as fourth, fifth and sixth locking grooves 252, 254 and 256. The first and fourth locking grooves 246 and 252 can be aligned with a same first diameter axis, the fourth locking groove 252 being closer to the shaft portion 218 than the first locking groove 246. The second and fifth locking grooves 248 and 254 can be aligned with a same second diameter axis, the fifth locking groove 254 being closer to the shaft portion 218 than the second locking groove 248. The third and sixth locking grooves 250 and 256 can be aligned with a same third diameter axis, the sixth locking groove 256 being closer to the shaft portion 218 than the third locking groove 250.

The biasing action of the spring 232 can keep the latch element 222 in the locked position, such that the first and second studs 224 and 226 can respectively engage with a pair of locking grooves, such as the first and fourth locking grooves 246 and 252 as shown in FIG. 11. The handle 204 can be thereby locked in a desired angular position.

As shown in FIG. 12, the actuator element 236 can be operated to slide on the outer surface of the second coupling element 214 to displace the latch element 222 from the locked position toward the unlocked position and compress the spring 232. As a result, the first and second studs 224 and 226 can respectively disengage from the first and fourth locking grooves 246 and 252 in a simultaneous manner, and the handle 204 can be rotated relative to the seat shell 202 until it reaches a desired angular position. The actuator element 236 then can be released, and the spring 232 can urge the latch element 222 to recover a locked state in engagement with another pair of locking positions, e.g., the second and fifth locking grooves 248 and 254, or the third and sixth locking grooves 250 and 256. The handle 204 can be accordingly securely in place in multiple angular positions (such as the three angular positions shown in FIGS. 1, 6 and 7) as described previously.

At least one advantage of the structures described herein is the ability to provide an adjustment mechanism between a handle and a seat shell of an infant safety seat that is simple in construction, and only requires a small amount of component parts. The adjustment mechanism can be easily operated to switch the handle between locked and unlocked states. The smaller amount of component parts can also advantageously reduce the weight of the handle, and decrease its manufacture cost.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant safety seat comprising:
 a seat shell having at least one side provided with a first coupling element, the first coupling element including a plurality of locking grooves;
 a handle pivotally connected with the seat shell about a pivot axis, the handle having at least one side provided with a second coupling element that is pivotally connected with the first coupling element about the pivot axis, wherein the second coupling element has an interior defining a guide slot, and an outer surface provided with a second guide slot; and
 a latch element movably assembled in the guide slot and including at least a first stud and two catch holes, the latch element being operable to switch between a locked state where the first stud is engaged with one of the locking grooves to hold the handle in place, and an unlocked state where the first stud is disengaged from the locking grooves to allow rotation of the handle relative to the seat shell; and
 an actuator element movably assembled in the second guide slot and operable to slide relative to the second coupling element, a surface of the actuator element facing the second coupling element including two fastener fingers that respectively pass through two slots formed through the second coupling element and respectively engage with the two catch holes of the latch element.

2. The infant safety seat according to claim 1, wherein the first coupling element has an interior in which are defined a first cavity and a second cavity in which are arranged the locking grooves for engagement of the latch element, the interior of the first coupling element further including a shaft portion having an opening and projecting at a center position toward the second coupling element.

3. The infant safety seat according to claim 2, wherein the first cavity has a first sidewall provided with a first, a second and a third locking groove disposed in different radial directions relative to the shaft portion, and the second cavity has a second sidewall provided with a fourth, a fifth and a sixth locking groove disposed in different radial directions relative to the shaft portion, the first and fourth locking grooves being aligned on a first axis, the second and fifth locking grooves being aligned on a second axis, and the third and sixth locking grooves being aligned on a third axis.

4. The infant safety seat according to claim 3, wherein the second coupling element has an interior provided with an axle protruding at a center position toward the first coupling element, the axle being assembled through the shaft portion to pivotally connect the first and second coupling elements.

5. The infant safety seat according to claim 4, wherein the latch element further includes a second stud, the first and second studs being formed on a surface of the latch element facing the first coupling element, and the shaft portion is assembled through a region of the latch element between the first and second studs.

6. The infant safety seat according to claim 5, wherein the first and second studs of the latch element respectively engage with the first and fourth locking grooves to lock the handle in a first angular position relative to the seat shell.

7. The infant safety seat according to claim 5, wherein the first and second studs of the latch element respectively engage with the second and fifth locking grooves to lock the handle in a second angular position relative to the seat shell.

8. The infant safety seat according to claim 5, wherein the first and second studs of the latch element respectively engage with the third and sixth locking grooves to lock the handle in a third angular position relative to the seat shell.

9. The infant safety seat according to claim 4, wherein the interior of the second coupling element further includes a spring placed between the latch element and the shaft portion.

10. The infant safety seat according to claim 1, wherein the actuator element has an outer surface that is substantially flat to conform with the outer surface of the second coupling element.

11. An infant safety seat comprising:
 a seat shell having at least one side provided with a first coupling element, the first coupling element including a plurality of locking grooves;
 a handle pivotally connected with the seat shell about a pivot axis, the handle having at least one side provided with a second coupling element that is pivotally connected with the first coupling element about the pivot axis, and the second coupling element having an outer surface that extends in a plane parallel to a side of the seat shell and includes an inset guide slot, the pivot axis intersecting the outer surface;
 a latch element movably assembled in the second coupling element and including at least a first stud, the latch element being operable to switch between a locked state where the first stud is engaged with one of the locking grooves to hold the handle in place, and an unlocked state where the first stud is disengaged from the locking grooves to allow rotation of the handle relative to the seat shell; and
 an actuator element assembled in the guide slot and operable to slide relative to the second coupling element, the actuator element having an inner surface and an outward facing surface, the inner surface being slidably received in the guide slot and fixedly connected with the latch element, and the outward facing surface having an elongated shape that is entirely exposed.

12. The infant safety seat according to claim 11, wherein one of the first and second coupling element further includes a shaft portion having an opening, and the other one of the first and second coupling element has an axle protruding at a center position and assembled through the opening of the shaft portion to pivotally connect the first and second coupling elements.

13. The infant safety seat according to claim 12, further including a spring placed between the latch element and the shaft portion.

14. The infant safety seat according to claim 11, wherein the first coupling element has an interior in which are defined a first cavity and a second cavity in which are arranged the locking grooves for engagement of the latch element.

15. The infant safety seat according to claim 14, wherein the first cavity has a first sidewall provided with a first, a second and a third locking groove disposed in different radial directions relative to the shaft portion, and the second cavity has a second sidewall provided with a fourth, a fifth and a sixth locking groove disposed in different radial directions relative to the shaft portion, the first and fourth locking grooves being aligned on a first axis, the second and fifth locking grooves being aligned on a second axis, and the third and sixth locking grooves being aligned on a third axis.

16. The infant safety seat according to claim 15, wherein the latch element further includes a second stud, the first stud being operable to engage with any of the first through third locking groove, and the second stud being operable to engage with any of the fourth through sixth locking groove.

17. The infant safety seat according to claim 16, wherein the first and second studs of the latch element respectively engage with the first and fourth locking grooves to lock the handle in a first angular position relative to the seat shell, the first and second studs of the latch element respectively engage with the second and fifth locking grooves to lock the handle in a second angular position relative to the seat shell, and the first and second studs of the latch element respectively engage with the third and sixth locking grooves to lock the handle in a third angular position relative to the seat shell.

18. The infant safety seat according to claim 11, wherein the fastening structure includes a fastener finger provided on the inner surface of the actuator element facing the second coupling element, the fastener finger passing through the second coupling element to engage with a catch hole of the latch element.

19. The infant safety seat according to claim 11, wherein the outward facing surface of the actuator element is substantially flat to conform with the outer surface of the second coupling element.

20. The infant safety seat according to claim 11, wherein the pivot axis intersects a portion of the actuator element that is exposed outward.

21. An infant safety seat comprising:
 a seat shell having at least one side provided with a first coupling element, the first coupling element including a plurality of locking grooves;
 a handle pivotally connected with the seat shell about a pivot axis, the handle having at least one side provided with a second coupling element that is pivotally connected with the first coupling element about the pivot axis, the second coupling element having an outer surface that extends in a plane parallel to a side of the seat shell and is formed with an inset guide slot, and the first and second coupling elements defining an inner cavity; and
 a latch element assembled in the inner cavity and including a stud, the latch element being operable to switch between a locked state where the stud is engaged with one of the locking grooves to hold the handle in place, and an unlocked state where the stud is disengaged from the locking grooves to allow rotation of the handle relative to the seat shell; and
 an actuator element assembled with the second coupling element and operable to slide along the guide slot relative to the second coupling element, the actuator element being fixedly connected with the latch element, and the actuator element having an outward facing surface that is exposed and extends on the outer surface of the second coupling element from a location adjacent to a peripheral edge of the second coupling element toward a central region of the outer surface of the second coupling element.

22. The infant safety seat according to claim 21, wherein the pivot axis intersects the outer surface.

* * * * *